June 30, 1964 E. D. DENMAN ETAL 3,139,617
HELICOPTER AIR VELOCITY SENSING SYSTEM
Filed Jan. 26, 1960 2 Sheets-Sheet 1

INVENTORS
EUGENE D. DENMAN, NEIL E. WELTER,
JAMES C. GRAVITT, BERNARD L. JONES
BY L. L. Shrago
ATTORNEY June 30, 1964

E. D. DENMAN ETAL 3,139,617

HELICOPTER AIR VELOCITY SENSING SYSTEM

Filed Jan. 26, 1960

INVENTORS
EUGENE D. DENMAN, NEIL E. WELTER,
JAMES C. GRAVITT, BERNARD L. JONES
BY L. I. Shrago.

ATTORNEY

United States Patent Office 3,139,617
Patented June 30, 1964

3,139,617
HELICOPTER AIR VELOCITY SENSING SYSTEM
Eugene D. Denman, Independence, Mo., Neil E. Weiter,
Fort Worth, Tex., James C. Gravitt, Kansas City, Mo.,
and Bernard L. Jones, Kansas City, Kans., assignors,
by mesne assignments, to the United States of America
as represented by the Secretary of the Navy
Filed Jan. 26, 1960, Ser. No. 4,840
9 Claims. (Cl. 343—8)

The present invention relates generally to apparatus for and methods of determining air velocity and, more particularly, to an air speed measuring system which senses the velocity of a moving vehicle relative to an adjacent undisturbed air mass.

The low speed capability of helicopters and other types of vertical take-off and landing aircraft has accentuated the need for a system which can measure accurately air velocity in the relatively low range. This velocity and the direction of wind velocity must be available either to the pilot or a computer for navigational purposes and, especially, so that the range and radius of action of these aircrafts can be continuously monitored. Furthermore, the pilot must be kept informed of his instantaneous air velocity in order that he may avoid certain dangerous flight regimes such as "setting with power."

Past attempts at measuring air velocity in the low speed region have either met with failure or lacked the required accuracy and repeatability, primarily due to rotor induced turbulence. This turbulence, it would be appreciated, adversely affects the accuracy of the conventional air measuring system since it creates a fluctuating pressure environment for the velocity sensing component.

Accordingly, the primary object of the present invention is to provide a method and technique for sensing the velocity of a moving vehicle relative to a surrounding, undisturbed air mass.

Another object of the present invention is to provide a method for measuring air speed which is not affected by turbulence in the immediate vicinity.

Another object of the present invention is to provide an air speed indicating system for use in helicopters and the like which gives accurate results in the low speed region.

A still further object of the present invention is to provide a system for providing the pilot of a helicopter with an instantaneous, accurate reading of his air speed.

A still further object of the present invention is to provide an air speed sensing system employing electromagnetic and acoustic energy.

A still further object of the present invention is to provide a technique for determining air velocity which utilizes the phenomenon of microwave energy scattering from dielectric perturbations in the atmosphere.

A still further object of the present invention is to provide a method for obtaining the velocity of a moving vehicle, which method in effect utilizes a relatively stationary, remote air mass to determine relative velocity.

A still further object of the present invention is to provide an arrangement for determining wind velocity and direction.

Other objects and many of the attendant advantages of this invention will be readily appreciated as the same becomes better understood by reference to the following detailed description when considered in connection with the accompanying drawings wherein:

FIG. 1 schematically illustrates the phenomenon of electromagnetic scattering from an acoustically perturbed area which is utilized in the velocity measuring apparatus of the present invention;

In general terms, the above objects of invention are realized by making use of the fact that electromagnetic energy can be scattered from an atmospheric region which is perturbed with acoustic energy. This perturbation, as is well known, causes a change in the index of refraction of this region, and the resultant variations act as an electromagnetic energy reflecting means. Basically, the system of the present invention radiates an acoustic wave of frequency $f_a$ out beyond the turbulent region produced by the various rotors of the helicopter into the undisturbed atmosphere. At the same time, an electromagnetic wave of frequency $f_e$ is also propagated in the same general direction and a significant amount of scattering of this energy takes place when it encounters the periodic dielectric perturbations in the undisturbed atmospheric region brought about by the acoustic energy. It has been found that the amount of scattered energy is maximized when $f_e$ and $f_a$ have a particular relationship. Furthermore, if the acoustic wave is discontinuous, that is, if it ends abruptly in space, its position and/or velocity can be determined from analyzing the characteristics of the reflected electromagnetic energy. Which of these two parameters is determined depends upon the form of the electromagnetic system.

Figure 1:
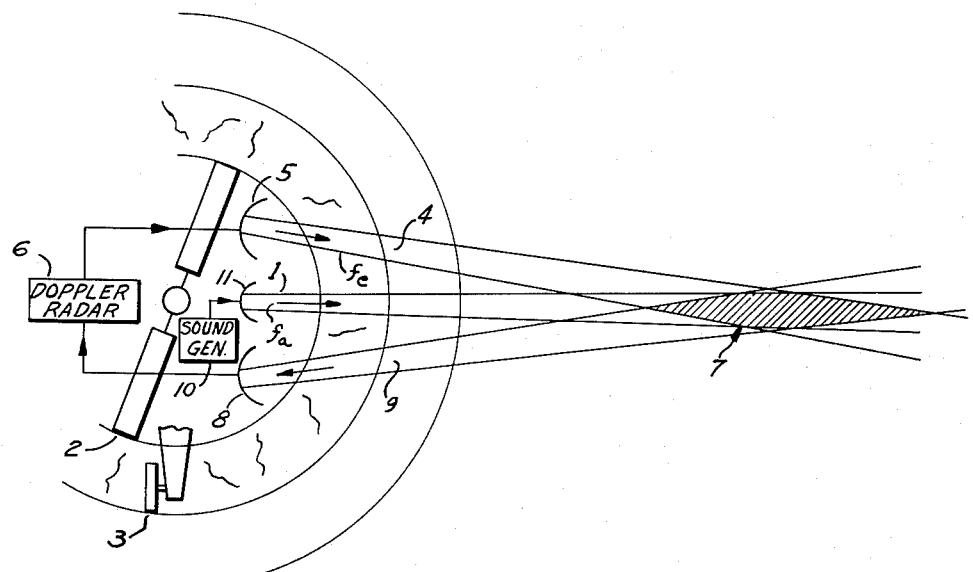

To illustrate the above mode of operation, reference may be made to FIG. 1 which schematically illustrates the interaction of an acoustic beam 1, which is generated by a suitable sound source 10 having a cooperating beam forming reflector 11 and radiated from the helicopter beyond the region of turbulence caused by, for example, rotors 2 and 3, and an electromagnetic beam 4 radiated from the transmitting antenna 5 of a conventional Doppler radar set 6. As mentioned hereinbefore, a portion of the electromagnetic energy will be back-scattered from the perturbed region 7 to the receiving antenna 8 along a path approximately defined by beam 9. The Doppler shift in frequency of this energy brought about by the relative motion of the helicopter and the reflecting area can be analyzed to provide a measure of the velocity of the helicopter. It will be appreciated that this Doppler shift is proportional to only one radial component of the air speed so that measurements in two directions are necessary to determine the resultant air speed. These measurements can be made by simply rotating the different antennas by any conventional mechanism.

If the location of the perturbation is assumed to be stationary with respect to the electromagnetic energy, which assumption is permissible on a short time basis because the velocities of propagation of the acoustic and electromagnetic energy differ by a factor of approximately $10^6$, and if an isotropic medium is assumed, then, based on an examination of the Mathieu equation derived from Maxwell's equation, the proper ratio of wave lengths of the electromagnetic and acoustic energy for maximum scattering can be shown to be $2/A$, where $A=1$. It has also been determined that the scattering is increased if the incident electromagnetic energy traverses a large number of acoustic wave lengths. Consequently, the separate transmitting and receiving antenna arrangement of FIG. 1 does not constitute the most efficient configuration and, preferably, a single antenna system should be used with coaxial acoustic and radar beams. With such a coaxial relationship, the interaction volume extends theoretically to infinity. Although the condition corresponding to $A=1$ in the above expression results in maximum scattering, significant scattering does occur at different modes defined by successive integer values of A.

As mentioned hereinbefore, an instantaneous method for measuring helicopter air velocity is to employ either a continuous wave, CW, or pulse Doppler radar set to sample the perturbed region. Actually, there are two Doppler effects occurring in the illustration of FIG. 1. First, the frequency $f_e$ of the wave incident on the perturbation is shifted because of the relative motion of the helicopter and the perturbation; then, the scattered wave received by the helicopter is shifted further as a result of the same relative movement. Both of these shifts, however, will be ordinarily in the same direction. It can be shown mathemtically that the frequency shift $$\Delta f = f_e \frac{2\frac{v}{c}}{1 - \frac{v}{c}}$$

where $v$ is the velocity of the helicopter relative to the perturbation in meters per second and $c$ is the velocity of light, also expressed in meters per second. For the usual range of helicopter speeds, $\Delta f$ can be taken as equal to $$f_e \left(2\frac{v}{c}\right)$$

without any appreciable error.

Figure 2:
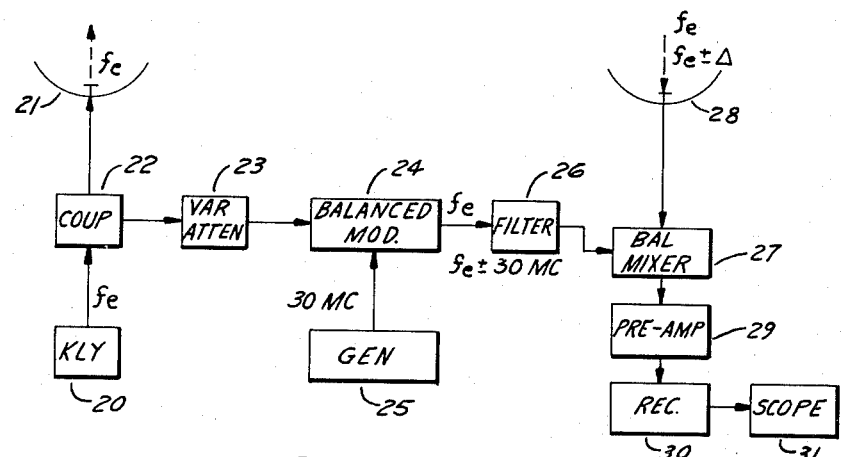
FIG. 2 illustrates a continuous wave Doppler system for determining air velocity.

One of the more serious disadvantages of the conventional Doppler system as far as the present invention is concerned is the necessity of amplifying at audio frequencies where helicopter vibrational noises and other disturbances are high. In order to minimize this interference and thereby increase the sensitivity of the overall measuring system, the conventional CW Doppler systme can be modified as shown in FIG. 2. Here, Klystron oscillator 20 generates the carrier wave $f_e$ which is fed to the transmitting antenna 21 and also via coupler 22 and variable attenuator 23 to one input of a balanced modulator 24. The other input to this modulator is derived from a high frequency generator 25 which, for discussion purposes, may be considered as developing a 30-megacycle signal. The output of the balanced modulator, that is, frequencies $f_e$ and $f_e \pm 30$ megacycles, is fed to a band-pass filter 26 which attenuates the carrier and the lower side band and passes the upper side band with little attenuation. This upper side band $f_e + 30$ megacycles serves as the local oscillator signal for a balanced mixer 27 so that one of its inputs is always 30 megacycles above the transmitted carrier. The other input to the balanced mixer 27 is the Doppler shifted signal $f_e \pm \Delta f$ detected by receiving antenna 28. Thus, the output from this circuit will be a 30-megacycle signal modulated by $\Delta f$. This signal is selectively amplified by preamplifier 29 tuned to this part of the frequency spectrum and thereafter supplied to a receiver 30. The air velocity can be determined by simply analyzing the video output of this receiver. For example, the video signal can be applied to an oscilloscope 31 and its frequency determined by a Lissajous pattern obtained by reacting this signal with a known audio frequency. The output of the receiver, $\Delta f$, can also be converted to a series of pulses whose repetition rate is equal to $\Delta f$, and the pulses counted by a digital counter.

Figure 3:
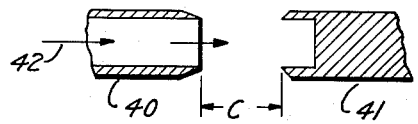
FIG. 3 shows the essential components of a Hartmann jet whistle.

Atmospheric regions having a finite change in their dielectric constant can be created by ionization and by acoustic shock waves. The basic construction of a Hartmann air jet whistle capable of developing a satisfactory acoustic wave for use in the present invention is schematically illustrated in FIG. 3. Essentially, the noise source generator consists of a tubular nozzle 40 and a coaxially spaced cylindrical resonator 41. Excitation takes place when the air stream emanating from the nozzle exceeds the speed of sound and the nozzle-to-resonator distance $c$ is properly adjusted. The intensity of this generator also varies in accordance with the pressure of the air reservoir feeding the nozzle, and increased amplitude can be obtained by heating the air mass within the resonant chamber.

Figure 4:
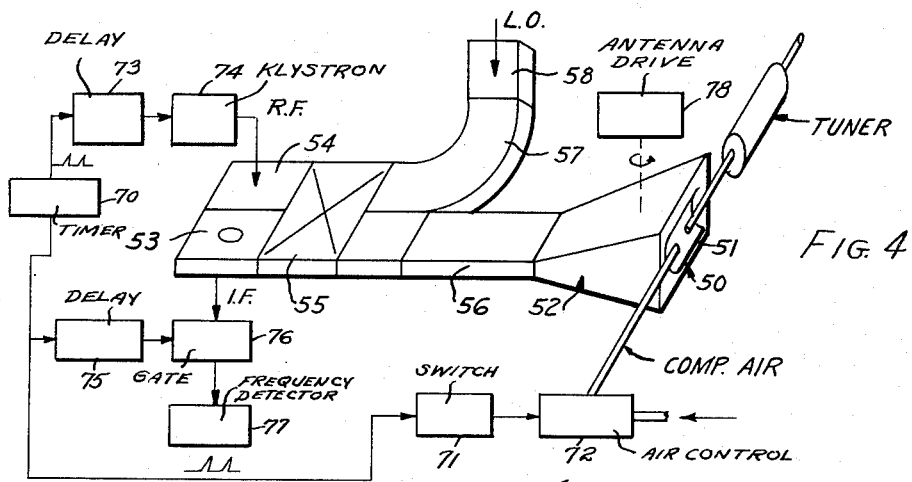
FIG. 4 shows an arrangement for producing coaxial electromagnetic and acoustic beams.

FIG. 4 depicts an arrangement for achieving coincident acoustic and electromagnetic energy beams wherein a Hartmann air jet whistle 50 focused by a parabolic reflector 51 is positioned in the mouth of a horn antenna 52 along the latter's axis of symmetry. This horn functions as the transmitting and receiving antenna for a gated Doppler radar system having as some of its wave guide components a crystal mixer 53, an RF input feed section 54, a hybrid junction 55, tuners 56 and 57 and a local oscillator feed section 58. This arrangement would be operated as a long-pulse or gated system with the acoustic and electromagnetic beams turned on alternately to eliminate reflections at very short ranges and provide discrimination in space for selecting the range at which the desired reflections occur.

Figure 5:
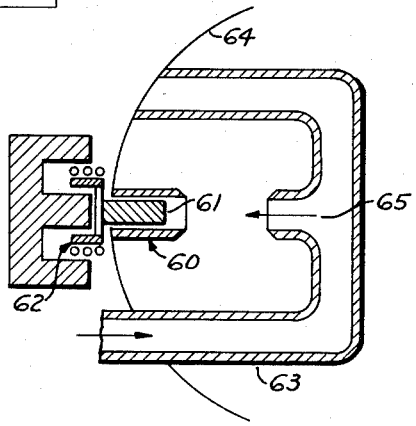
FIG. 5 shows schematically one modification for tuning the frequency of a Hartmann jet whistle.

As previously noted, maximum scattering of electromagnetic energy occurs when the wave length of the electromagnetic energy is twice that of the acoustic energy. Since the wave length of the acoustic energy varies with air velocity and temperature, it is desirable to have some way for tuning the acoustic sound source. A simple system for achieving this is shown in FIG. 5 wherein resonator 60 is provided with a movable piston 61 which is attached to a conventional speaker voice coil assembly 62. An air supply member, tubing 63, is bridged to the sound focusing parabolic reflector 64 and feeds nozzle 65. It will be apparent that by varying the energization of the voice coil, piston 61 can be displaced to alter the dimension of the resonator and the frequency of the jet whistle. Likewise, it will be appreciated that the frequency of the electromagnetic energy may be varied through conventional tuning equipment to compensate for any changes in the acoustic wave length brought about by atmospheric conditions.

If a pulse Doppler radar set is used to determine the air velocity by measuring the velocity of the acoustic disturbance, then a single antenna system can be employed. While such an arrangement simplifies the problem of obtaining coaxial acoustic and electromagnetic beams, it has the inherent disadvantage of requiring extremely short radar pulse widths to resolve the distance to the scatterer when measurements are made at very short ranges. At short ranges there is also imposed a severe requirement on the clearing capability of the radar receiver since fixed targets at all ranges will reflect much more electromagnetic energy than the acoustic disturbance and will tend to saturate the receiver. The distance to the scatterer can be chosen by employing time gating of the received pulses within the receiver. The acoustic energy is also pulsed so that the receiver gating can select the desired range to the interaction volume. To realize this general mode of operation, the system of FIG. 4, for example, may include a source of timing pulses 70 coupled via switch 71 to the control element of an air valve 72 which regulates the air flow to jet whistle 50 and selectively activates this sound source. The timing pulses may also be fed via a variable length delay circuit 73 to the RF source, klystron 74, for periodically radiating the electromagnetic beam. It should be understood that switch 71 need only be closed once for a predetermined number of activations of klystron 74 since a particular sound discontinuity may serve as a reflector for a multiplicity of electromagnetic radiations. In order to select the range to the interaction volume, the timing pulses may be fed to a second variable length delay circuit 75 and thence to a gate 76 included in the receiver circuit before the frequency detector 77. By controlling the gating period, the system may be made to respond to incoming signals originating at a predetermined range. It should also be appreciated that a conventional antenna drive device 78 can be mechanically coupled to the wave guide assembly to rotate horn 52 to different angular positions so that echo ranging may be performed with more than one discontinuity for the purpose hereinbefore stated.

It would also be noted that the use of a pulsed Doppler radar system rather than a continuous wave Doppler system is desirable since it simplifies the problem of eliminating from the measuring system any energy back-scattered from disturbances within the turbulent area of the helicopter. Also, pulsed radar permits greater peak power and consequently greater distances to the region at which the velocities are measured.

It would also be observed that the concept of using an electromagnetic probe to measure the velocity of a dielectric perturbation in the atmosphere can be employed for remote or indirect measurement of wind velocity, direction, air temperature and other atmospheric conditions. For example, the wind components both towards and away from the sensing apparatus are determinable depending on whether the Doppler frequency is above or below that expected from still air. Therefore, with just two systems orientated at 90° to each other, complete information as to wind velocity and direction can be obtained.

Obviously many modifications and variations of the present invention are possible in the light of the above teachings. It is therefore to be understood that within the scope of the appended claims the invention may be practiced otherwise than as specifically described.

What is claimed is:

1. In a method for calculating the air speed of a body moving in space which includes steps of producing at a distance remote from said body a volume of space perturbed with sonic energy, directing a beam of electromagnetic energy from said body toward said volume of space, subsequently detecting at said body electromagnetic energy back-scattered from said volume of space and determining the magnitude of the change in frequency of said detected electromagnetic energy brought about by the relative motion of said body and said volume of space.

2. In a method for determining the velocity of a body moving through space which comprises the steps of radiating from said body a beam of sound energy, subsequently radiating an electromagnetic beam of energy from said body, the directions of radiation of said beams being such as to result in their intersection at a distance remote from said body detecting the electromagnetic energy back-scattered from the reaction of said energies and measuring the amount of Doppler shift in frequency of said energy so detected.

3. In a method for determining the air speed of a moving body which comprises the steps of radiating from said body a beam of sound energy, the space occupied by said beam having its index of refraction changed from its normal value, echo ranging with a pulsed Doppler radar set on a remote volume of space occupied by said beam and observing the magnitude of the Doppler shift produced as a consequence of the movement of said body.

4. In a method for determining the velocity of a vehicle moving in space which includes the steps of radiating from said vehicle a beam of sound energy during a first interval, radiating from said vehicle a beam of electromagnetic energy of a predetermined frequency during a second interval which follows said first interval, said beams being coincidental and in a first direction, detecting electromagnetic energy back-scattered when said radiated elemtromagnetic energy encounters a portion of space which is perturbed by said sound energy and determining the change in the frequency of said electromagnetic energy so detected.

5. In a method as defined in claim 4, the additional steps of radiating from said vehicle a beam of sound energy during a third interval, subsequently radiating from said vehicle a beam of electromagnetic energy having said predetermined frequency during a fourth interval, the directions of radiation of said beams being coincidental but in a second direction, detecting electromagnetic energy back-scattered when electromagnetic energy radiated during said fourth interval reacts with sound energy radiated during said third interval, and determining the change in frequency of said electromagnetic energy so detected.

6. Apparatus for determining the air velocity of a moving vehicle comprising a pulse radar set carried by said vehicle, said set including a directional electromagnetic energy radiating and detecting antenna and a sound energy beam forming means located along the axis of symmetry of said antenna whereby concentric sound energy and electromagnetic energy beams can be radiated into the same space.

7. Apparatus for determining the air velocity of a moving vehicle comprising, in combination, a pulse radar set carried by said vehicle, said radar set including as a component thereof an electromagnetic energy horn, a sound source located at the center of the mouth of said horn, said sound source including a tubular orifice, a spaced resonant cavity facing said orifice and a beam forming reflector disposed behind said orifice and said resonant cavity, said sound source being activated when an air stream emerging from said orifice exceeds the speed of sound.

8. Apparatus as defined in claim 7, comprising means for activating said sound source during a first time interval and means for feeding electromagnetic energy to the throat of said horn during a second time interval following said first time interval.

9. Apparatus for determining the air velocity of a helicopter comprising, in combination, a pulse radar set carried by said helicopter, means for radiating at a first time from said helicopter a beam of sound energy along the directional axis of the antenna of said radar set, means for subsequently triggering the transmitting portion of said radar set whereby electromagnetic energy is radiated by said antenna at a time when said sound energy is perturbing a region of space beyond the space disturbed by the rotors of said helicopter, means for gating the receiving portion of said radar set whereby electromagnetic energy back-scattered from the reaction of said electromagnetic energy and said sound energy is detected during a predetermined time interval, and means for determining the frequency shift experienced by the detected electromagnetic energy as a result of the movement of said helicopter after the radiation of said electromagnetic energy.

References Cited in the file of this patent

UNITED STATES PATENTS

| | | |
|---|---|---|
| 2,678,625 | Hall et al. | May 18, 1954 |
| 2,770,795 | Peterson | Nov. 13, 1956 |
| 2,784,693 | Burrows | Mar. 12, 1957 |
| 2,836,811 | McArthur | May 27, 1958 |
| 2,855,590 | Gray | Oct. 7, 1958 |
| 2,856,602 | Carlin | Oct. 14, 1958 |